(12) United States Patent
Oh

(10) Patent No.: US 8,203,823 B2
(45) Date of Patent: Jun. 19, 2012

(54) METAL CAPACITOR AND MANUFACTURING METHOD THEREOF

(76) Inventor: Young Joo Oh, Seoul (KR)

(*) Notice: Subject to any disclaimer, the term of this patent is extended or adjusted under 35 U.S.C. 154(b) by 1040 days.

(21) Appl. No.: 12/155,770

(22) Filed: Jun. 10, 2008

(65) Prior Publication Data

US 2009/0180239 A1    Jul. 16, 2009

(30) Foreign Application Priority Data

Jan. 11, 2008 (KR) .......................... 10-2008-0003420
May 23, 2008 (KR) .......................... 10-2008-0048003

(51) Int. Cl.
*H01G 4/005* (2006.01)
*H01G 4/30* (2006.01)
*H01G 4/228* (2006.01)
*H01G 4/06* (2006.01)

(52) U.S. Cl. .................. 361/303; 361/301.4; 361/306.1; 361/321.1

(58) Field of Classification Search .................. 361/303, 361/301.4, 306.1, 321.1
See application file for complete search history.

(56) References Cited

U.S. PATENT DOCUMENTS

| | | | |
|---|---|---|---|
| 6,166,899 A | 12/2000 | Tamamitsu | |
| 6,421,224 B1* | 7/2002 | Lin et al. | 361/306.3 |
| 6,855,177 B2* | 2/2005 | Fujii et al. | 29/25.03 |
| 7,326,261 B2* | 2/2008 | Nagasawa et al. | 29/25.03 |
| 7,793,396 B2* | 9/2010 | Shioga et al. | 29/25.41 |

* cited by examiner

*Primary Examiner* — Jayprakash N Gandhi
*Assistant Examiner* — Arun Ramaswamy
(74) *Attorney, Agent, or Firm* — Rosenberg, Klein & Lee

(57) ABSTRACT

A metal capacitor in which an electric conductivity is significantly improved is provided. The metal capacitor includes: a metal member 11 including a plurality of grooves 11a; a metal oxide film 12 being formed on the metal member 11; a sealing electrode member 13 being formed on the metal oxide film 12 to fill in the plurality of grooves 11a; and an insulating layer 14 being formed on the sealing electrode member 13 and the metal oxide film 12 to insulate the metal member 12 and the sealing electrode member 13.

31 Claims, 10 Drawing Sheets

METAL CAPACITOR AND MANUFACTURING METHOD THEREOF

BACKGROUND

1. Field

The present invention relates to a metal capacitor and a manufacturing method thereof, and more particularly, to a metal capacitor in which an electric conductivity is significantly improved.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to the current development in digitalization and thinness of electronic devices, when applying the conventional aluminum electrolytic capacitor, there are some problems as follow.

Since the aluminum electrolytic capacitor uses the electrolyte, an electric conductive is comparatively low and thus a lifespan of the aluminum electrolytic capacitor is reduced in a high frequency area. Also, there are some constraints on improvement of reliability, a high frequency response, a low equivalent series resistance (ESR), and impedance. Also, due to a comparatively high ripple pyrexia, there are some constraints on stability and environments, such as fuming and firing.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof.

The present invention also provides a metal capacitor which can improve a miniature, a low equivalent series resistance (ESR), a reduction in a ripple pyrexia, a long life, a heat-resistant stability, non-fuming, non-firing, and environment by using a metal material for an electrolyte, and a manufacturing method thereof.

According to an aspect of the present invention, there is provided a metal capacitor including: a metal member including a plurality of grooves on its one surface; a metal oxide film being formed on the metal member; an insulating layer being formed on the metal oxide film to insulate the metal member and the sealing electrode member; and a sealing electrode member being formed on the metal oxide film to fill in the plurality of grooves.

According to another aspect of the present invention, there is provided a method of manufacturing a metal capacitor, the method including: masking another surface of a metal member using a resin film; forming a plurality of grooves on one surface of the metal member by using a direct current (DC) etching, when the other surface of the metal member is masked; forming a metal oxide film o the metal member by using an anodizing way, when the plurality of grooves is formed on the metal member; forming an insulating layer on the sealing electrode member and the metal oxide film by using a chemical vapor deposition (CVD); and forming a sealing electrode member to fill in the plurality of grooves formed on the metal member by using an electroless planting or an electroplating.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, a configuration of a metal capacitor according to a first embodiment of the present invention will be described with reference to the accompanying drawings.

Figure 1A:
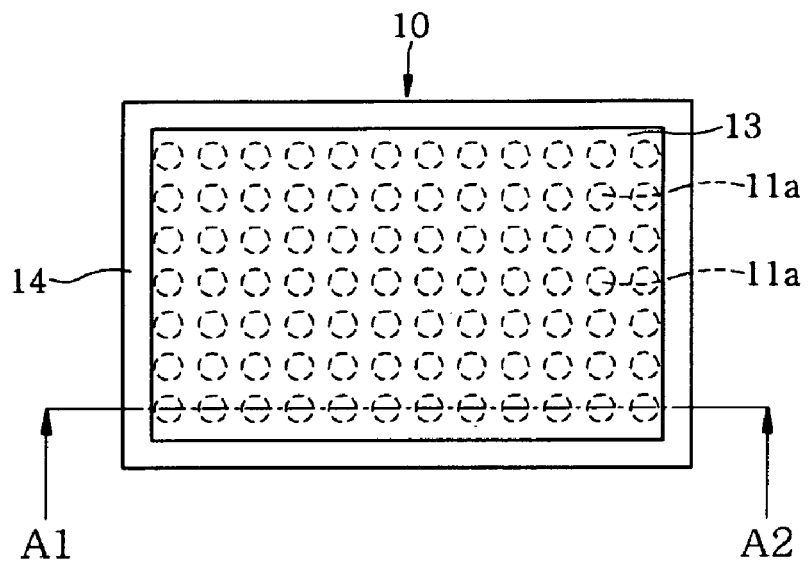
FIGS. 1A through 1E illustrate a metal capacitor according to a first embodiment of the present invention.

FIG. 1A is a top view of the metal capacitor according to the first embodiment of the present invention. FIGS. 1B through 1E are cross-sectional views cut along A1-A2 line of the metal capacitor shown in FIG. 1A.

As shown in FIGS. 1A through 1E, a metal capacitor 10 includes a metal member 11, a metal oxide film 12, a sealing electrode member 13, and an insulating layer 14. Hereinafter, a configuration thereof will be described.

The metal member 11 includes a plurality of grooves 11a on its one surface. The metal oxide film 12 is formed on the metal member 11. The sealing electrode member 13 is formed on the metal oxide film to fill in the plurality of grooves. The insulating layer 14 is formed on the metal oxide film 12 to insulate the metal member 11 and the sealing electrode member 13. The insulating layer 14 can be formed after forming the sealing electrode member 13. Thus, the insulating layer 14 is formed on a metal oxide film 12 and/or the sealing electrode member 13.

Hereinafter, each configuration of the metal capacitor 10 according to the first embodiment will be further described in detail.

The metal member 11 is formed in a foil or a planar shape and uses any one of aluminum (Al), niobium (Nb), tantalum (Ta), zirconium (Zr), and titanium (Ti). The metal oxide film 12 is formed on the whole surface of the metal member 11 as shown in FIGS. 1C through 1D, or is formed on one surface where the plurality of grooves is formed as shown in FIG. 1E. The metal oxide film 12 uses any one of alumina ($Al_2O_3$), niobium pentoxide (Nb2O5), niobium monoxide (NbO), tantalum pentoxide (Ta2O5), zirconium dioxide (ZrO2), and titanium dioxide (TiO2).

The sealing electrode member 13 may use any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au). A plurality of first external electrodes 21 as shown in FIG. 1D or a plurality of second external electrodes 22 as shown in FIG. 1E is further provided to be connected to the metal member 11 and the sealing electrode member 13. The plurality of first external electrodes 21 may be connected to the metal member 11 and the sealing electrode member 13 respectively to thereby use the metal capacitor 10 regardless of a polarity. One of the plurality of second external electrodes 22 is an anode electrode and another thereof is a cathode electrode, which is different from the plurality of first external electrodes 21. The plurality of second external electrodes 22 is connected to the metal member 11 and the sealing electrode member 13 respectively to thereby enable the metal capacitor to have the polarity. Specifically, when the second external electrode 22 connected to any one of the metal member 11 and the sealing electrode member 13 is the anode electrode, the other second external electrode is the cathode electrode. Conversely, when the second external electrode 22 connected to any one of the metal member 11 and the sealing electrode member 13 is the cathode electrode, the other second external electrode 22 is the anode electrode.

As shown in FIG. 1D, a seed electrode layer 15 is interposed between the metal oxide film 12 and the sealing electrode member 13 to fill in and form the sealing electrode member 13 in the plurality of grooves 11a of the metal member 11. The seed electrode layer 15 uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au). The seed electrode layer 15 is provided to make the sealing electrode member 13 be readily filled in the plurality of grooves 11a of the metal member 11 and thereby have stronger adhesiveness with the metal oxide film 12.

The insulating layer 14 is formed on the metal oxide film 12 and the sealing electrode member 13 to surround the side of the sealing electrode member 13 to thereby electrically insulate the metal member 11 and the sealing electrode member 13. The molding member 31 is provided to seal the metal member 11 using a molding material such as epoxy molding compound (EMC). When molding the metal member 11, the molding member 31 molds the metal member 11 in any one of a planar shape and a cylindrical shape. When molding the metal member 11 in the planar shape, the molding member packages the metal member 11 or a chip in a surface mounting type. When molding the metal member 11 in the cylindrical shape, the molding member 31 molds and winds the metal member 11 to be packaged as a lead type.

Hereinafter, another embodiment of the metal capacitor 10 shown in FIGS. 1A through 1E will be described with reference to the accompanying drawings.

Figure 2A:
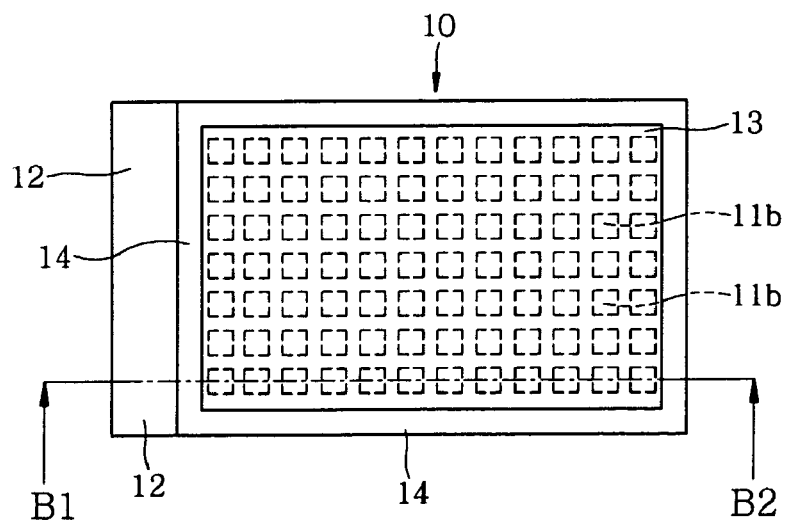
FIGS. 2A through 2C illustrate another embodiment of the metal capacitor shown in FIG. 1A.
Figure 2B:
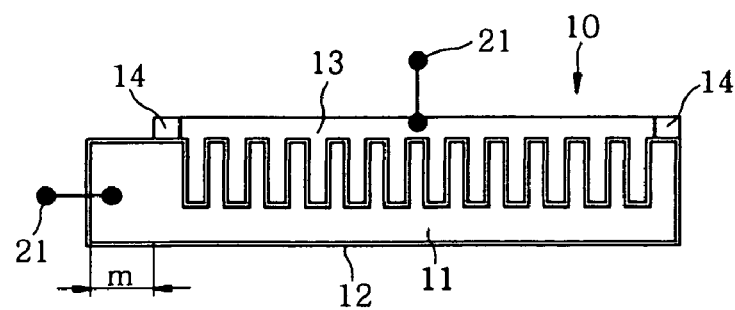
Figure 2C:
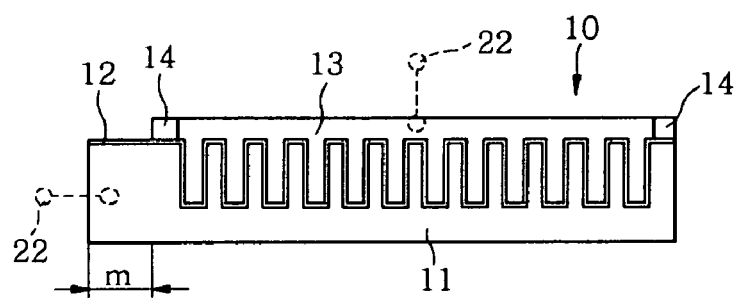

FIGS. 2A through 2C illustrate another embodiment of the metal capacitor shown in FIG. 1A. FIG. 2A is a top view of the metal capacitor. FIGS. 2B and 2C are cross-sectional views cut along B1-B2 line of the metal capacitor shown in FIG. 2A.

As shown in FIGS. 2A through 2C, according to the other embodiment of the metal capacitor 10, the plurality of grooves 11a formed on the metal member 11 may be formed in the shape of a polygon such as a square or a circle shown in FIG. 1A. The metal member 11 that includes a plurality of square grooves 11b may include an electrode withdrawing portion m as shown in FIGS. 2B and 2C. The electrode withdrawing portion m is formed by extending the metal member 11 by the electrode withdrawing portion m. The electrode withdrawing portion m is provided to more readily connect the first external electrode 21 or the second external electrode to the metal member 11. The metal member 11 formed with the electrode withdrawing portion m is formed on the whole surface of the metal oxide film 12, or is formed on one surface where the plurality of square grooves 11b is formed.

Hereinafter, still another embodiment of the metal capacitor 10 shown in FIGS. 1A through 1E will be described with reference to the accompanying drawings.

Figure 3A:
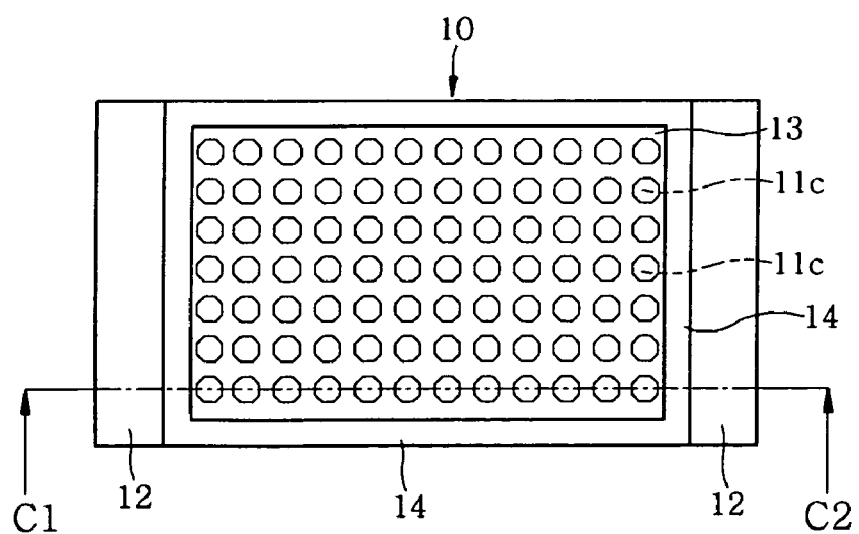
FIGS. 3A through 3C illustrate still another embodiment of the metal capacitor shown in FIG. 1A.
Figure 3B:
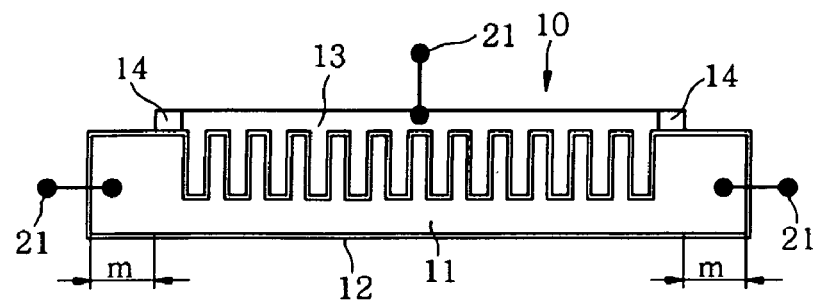
Figure 3C:
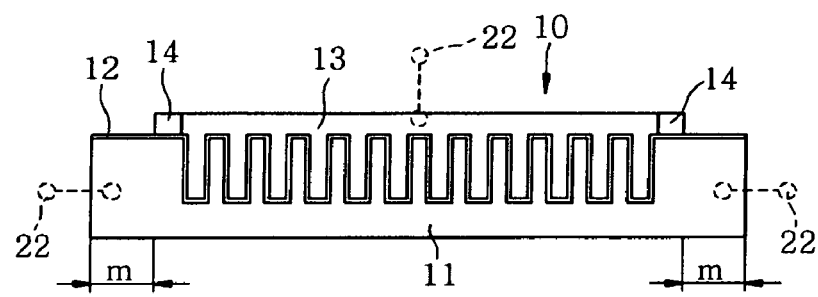

FIGS. 3A through 3C illustrate still another embodiment of the metal capacitor 10 shown in FIG. 1A. FIG. 3A is a top view of the metal capacitor. FIGS. 3B and 3C are cross-sectional views cut along C1-C2 line of the metal capacitor shown in FIG. 3A.

As shown in FIGS. 3A through 3C, according to still another embodiment of the present invention, the plurality of grooves 11a formed on the metal member 11 may be formed in the shape of a polygon such as a hexagon or a circle shown in FIG. 1A. The metal member 11 that includes a plurality of hexagon grooves 11a may include at least one electrode withdrawing portion as shown in FIGS. 3B and 3C. In FIGS. 3B and 3C, the metal member 11 includes two electrode withdrawing portions m. The first external electrode 21 or the second external electrode may be connected to each of the electrode withdrawing portions m to thereby construct the metal capacitor having two terminals or three terminals. The metal oxide film 12 formed on the metal member 11 where at least one electrode withdrawing portion m is formed to construct the metal capacitor 11 having two terminals or three thermals includes the electrode withdrawing portion m and is formed on the whole surface or on one surface where the plurality of polygon grooves 11c is formed.

Second Embodiment

Hereinafter, a configuration of a metal capacitor according to a second embodiment of the present invention will be described with reference to the accompanying drawings.

FIGS. 4A through 4D illustrate a metal capacitor according to a second embodiment of the present invention.

As shown in FIGS. 4A through 4D, metal capacitors 110, 120, 130, and 140 according to the second embodiment are constructed as a plurality of single layer metal capacitance members 10a. Each of the plurality of single layer metal capacitance member 10a includes a metal member 11, a metal oxide member 12, a sealing electrode member 13, and an insulating member 14. Since configurations thereof are the same as the metal member 11, the metal oxide film 12, the sealing electrode member 13, and the insulating layer 14 according to the first embodiment shown in FIGS. 1A through 1E. Therefore, further detailed descriptions will be omitted herein.

The metal capacitors 110, 120, 130, and 140 constructed as the plurality of single layer metal capacitance member 10a according to the second embodiment will be sequentially described with reference to FIGS. 4A through 4D.

Figure 4A:
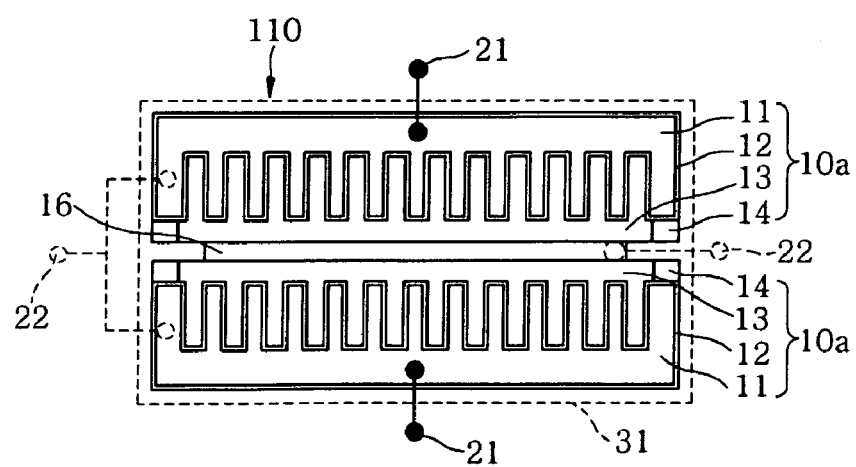
FIGS. 4A through 4D illustrate a metal capacitor according to a second embodiment of the present invention.

As shown in FIG. 4A, the metal capacitor 110 according to the second embodiment includes the plurality of single layer metal capacitance members 10a and a plurality of external electrodes 21.

Each single layer metal capacitance member 10a includes the metal member 11, the metal oxide film 12, the sealing electrode member 13, and the insulating layer 14. The plurality of single layer metal capacitance members 10a is provided in parallel to contact with the sealing electrode member 13. The metal oxide film 12 of each of the plurality of single layer metal capacitance members 10a is formed on the whole surface of the metal member 11. As shown in FIG. 4A, the plurality of first external electrodes 21 is connected to the plurality of single layer metal capacitance members 10a to thereby enable the metal capacitor 110 to be used regardless of a polarity.

The metal capacitor 110 where the plurality of single layer metal capacitance members 10a is provided in parallel is connected to the plurality of second external electrodes 22 indicted by dotted lines in FIG. 4A. One of the plurality of second external electrodes 22 is an anode electrode and another thereof is a cathode electrode. The plurality of second external electrodes 22 is connected to the metal capacitor to make the metal capacitor 110 have the polarity. One of the plurality of second external electrodes 22 is connected to the metal member 11 of each single layer metal capacitance member 10a and another thereof is connected to the contacting sealing electrode member 13.

A conductive adhesive member 16 is further interposed between the plurality of single layer metal capacitance members 10a to improve adhesiveness. The conductive adhesive member 16 uses adhesives such as a conductive solder paste and the like. The plurality of single layer metal capacitance members 10a further includes a molding member 31. The molding member 31 molds the plurality of single layer metal capacitance members 10a in any one of a planar shape and a cylindrical shape. When molding the metal member 11 in the cylindrical shape, the molding member 31 winds and molds the plurality of single layer metal capacitance members 10a.

Figure 4B:
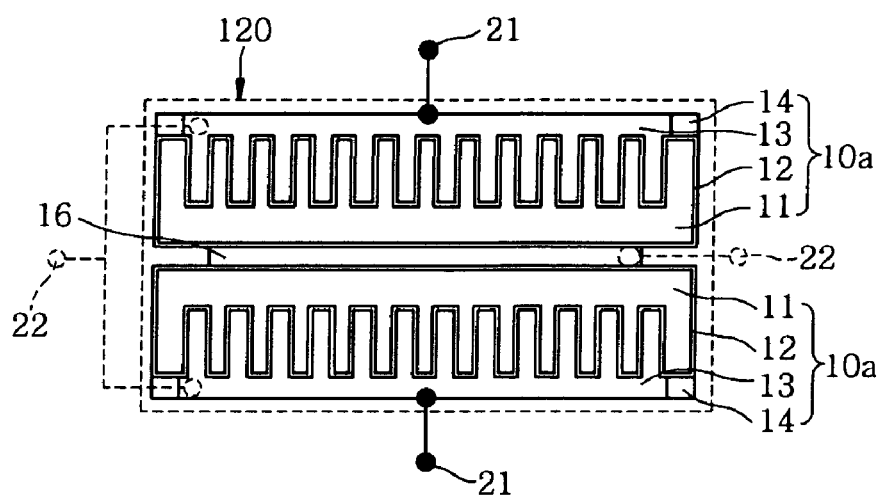

As shown in FIG. 4B, the metal capacitor 120 according to the second embodiment includes the plurality of single layer metal capacitance members 10a and a plurality of first external electrodes 21. The metal capacitor 120 shown in FIG. 4B has the same configuration as the metal capacitor 110 shown in FIG. 4A and thus further detailed description will be omitted herein. The difference therebetween is that the plurality of single layer metal capacitance members 10a is provided in parallel to make the metal members 11 contact with each other. Since the plurality of single layer metal capacitance members 10a is provided in parallel to make the metal members 11 contact with each other, the plurality of first external electrodes 21 is connected to the sealing electrode member 13 of each single layer metal capacitance member 10a. Also, when connecting the plurality of second external electrodes 22, one thereof is connected to the sealing electrode member 13 of the single layer metal capacitance member 10a and another thereof is connected to the contacting metal member 11.

Figure 4C:
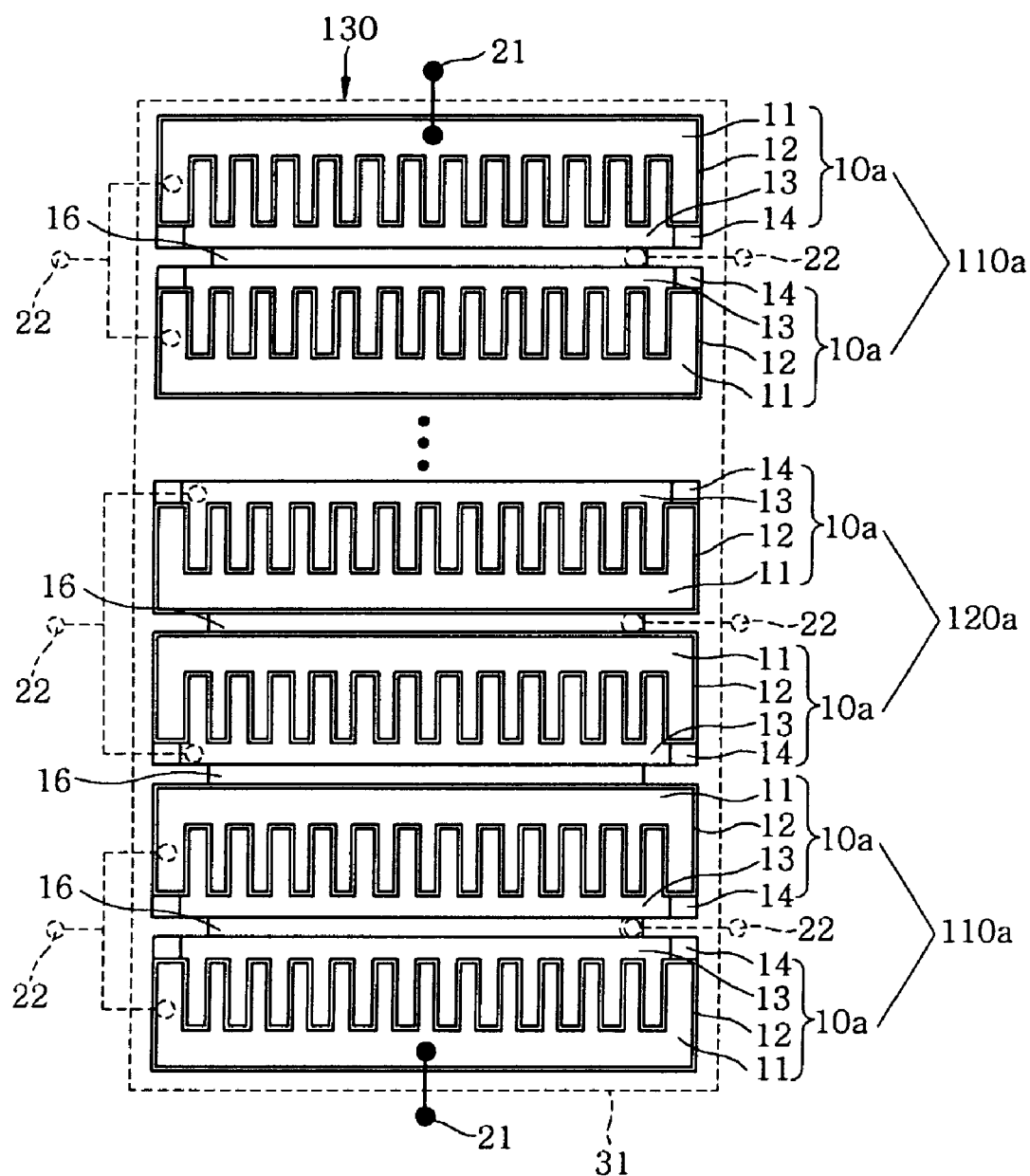

As shown in FIG. 4C, the metal capacitor 130 according to the second embodiment includes a plurality of first parallel multi-layer bodies 110a, a plurality of second parallel multi-layer bodies 120a, and a plurality of second external electrodes 21.

The plurality of first parallel multi-layer bodies 110a is provided in parallel so that, among the plurality of single layer metal capacitance members 10a, the sealing electrode member 13 of an odd number$^{th}$ single layer metal capacitance member 10a may contact with the sealing electrode member 13 of an even number$^{th}$ single layer metal capacitance member 10a. The plurality of second parallel multi-layer bodies 120a is provided in parallel so that, among the plurality of single layer metal capacitance members 10a, the metal member 11 of the odd number$^{th}$ single layer metal capacitance member 10a may contact with the metal member 11 of the even number$^{th}$ single layer metal capacitance member 10a.

The plurality of first parallel multi-layer bodies 110a and the plurality of second parallel multi-layer bodies 120a constructed as above are provided in series/in parallel so that the metal member 11 of the even number$^{th}$ single layer metal capacitance member 10a of the first parallel multi-layer 110a may contact with the sealing electrode member 13 of the odd number$^{th}$ single layer metal capacitance member 10a of the second parallel multi-layer body 120a. Specifically, when the plurality of first parallel multi-layer bodies 110a and the plurality of second parallel multi-layer bodies 120a are provided in parallel, the metal capacitor 130 is provided in series/in parallel by sequentially providing in series the first parallel multi-layer body 110a and the second parallel multi-layer body 120a.

The plurality of first external electrodes 21 is connected to the metal member 11 of the odd number$^{th}$ single layer metal capacitance member 10a of a first locating first parallel multi-layer body 110a among the plurality of first parallel multi-layer bodies 110a and the metal member 11 of the even number$^{th}$ single layer metal capacitance member 10a of a last locating second parallel multi-layer body 120a among the plurality of second parallel multi-layer bodies 120a. The terms "odd number$^{th}$", "even number$^{th}$", "first", and "last" are defied based on the first parallel multi-layer body 110a that is disposed at the lowest bottom shown in FIG. 4C. For example, it is assumed that when the first parallel multiplayer body 110a disposed at the lowest bottom as shown in FIG. 4C is a first location, the single layer metal capacitance member 10a that is located in a lower place of the first locating first parallel multi-layer body 110a is an odd number$^{th}$ location.

The plurality of first parallel multi-layer bodies 110a and the plurality of second parallel multi-layer bodies 120a connected to the plurality of first external electrodes 21 are connected to the plurality of second external electrodes 22 indicated by dotted lines as shown in FIG. 4C. One of the plurality of second external electrodes 22 is an anode electrode and another thereof is a cathode electrode. One of the plurality of second external electrodes 22 is connected to the metal member 11 of each of the plurality of single metal capacitance members 10a of the plurality of first parallel multi-layer bodies 110a and the other is connected to the contacting sealing electrode member 13. The plurality of second parallel multi-layer bodies 120a connected to the plurality of first external electrodes 21 is connected to the plurality of second external electrodes 22 indicated by dotted lines shown in FIG. 4D. One of the plurality of second external electrodes 22 is connected to the sealing electrode member 13 of each of the plurality of single metal capacitance members 10a of the plurality of second parallel multi-layer bodies 120a and the other is connected to the contacting metal member 11.

Since the plurality of first parallel multi-layer bodies 110a and the plurality of second parallel multi-layer bodies 120a are connected to the plurality of second external electrodes 22 respectively, the metal capacitor 130 shown in FIG. 4C may be constructed to apply the plurality of first parallel multi-layer bodies 110a or the plurality of second parallel multi-layer bodies 120a as a single capacitor device. The metal capacitor 130 further includes a conductive adhesive member 16 interposed between each of the plurality of first parallel multi-layer bodies 110a and each of the plurality of second parallel multi-layer bodies 120a. In the plurality of first parallel multi-layer bodies 110a and the plurality of second parallel multi-layer bodies 120a that further includes the conductive adhesive member 16, the metal oxide film 12 of each single layer metal capacitance member 10a is formed on the whole surface of the metal member 11.

Figure 4D:
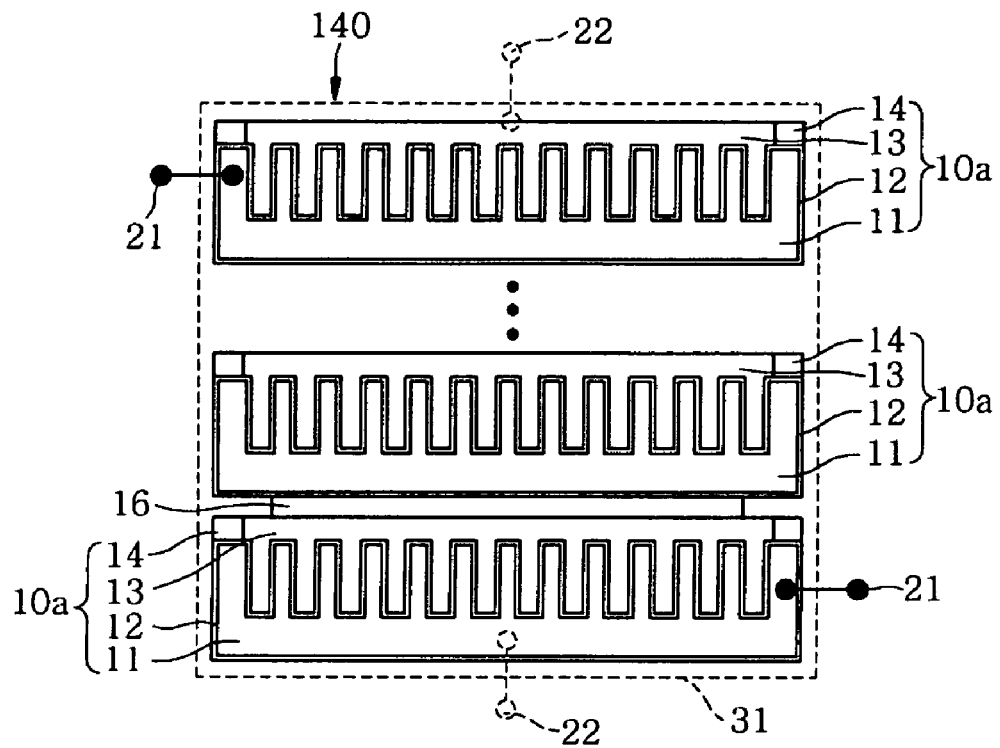

As shown in FIG. 4D, the metal capacitor according to still another embodiment of the second embodiment of the present invention includes the plurality of single layer metal capacitance members 10a and the plurality of first external electrodes 21.

As shown in FIG. 4D, the plurality of single layer metal capacitance members 10a is provided in series to make each metal member 11 contact with sealing electrode member 13. The plurality of first external electrodes 21 is connected to the metal members 11 of the first and the last single layer metal capacitance members 10a among the plurality of single layer metal capacitance members 10a.

The plurality of single layer metal capacitance members 10a connected to the plurality of first external electrodes 21 is connected to the plurality of second external electrodes 22, one of which is an anode electrode and another which is a cathode electrode. One of the plurality of second external electrodes 22 is connected to the metal member 11 of the first single layer metal capacitance member 10a among the plurality of single layer metal capacitance members 10a and the other thereof is connected to the sealing electrode member 13 of the last single layer metal capacitance member 10a. As described above, the metal oxide film 12 of each of the plurality of single layer metal capacitance members 10a constituting the metal capacitor 140 wherein the plurality of single layer metal capacitance members 10a is provided in series is formed on the whole surface of the metal member 11.

Third Embodiment

FIGS. 5A through 5D illustrate a metal capacitor according to a third embodiment of the present invention.

Figure 5A:
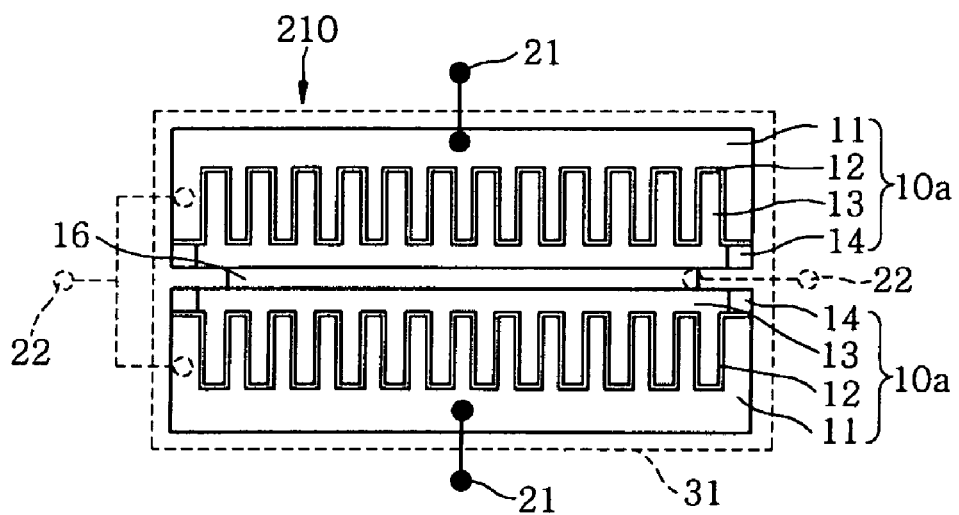
FIGS. 5A through 5D illustrate a metal capacitor according to a third embodiment of the present invention.
Figure 5B:
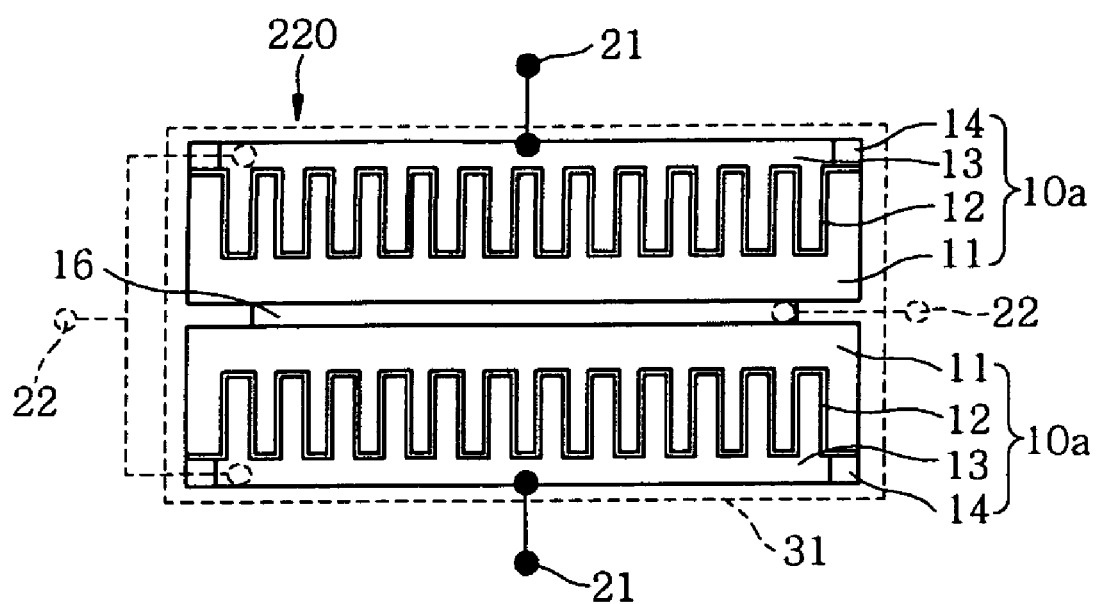
Figure 5C:
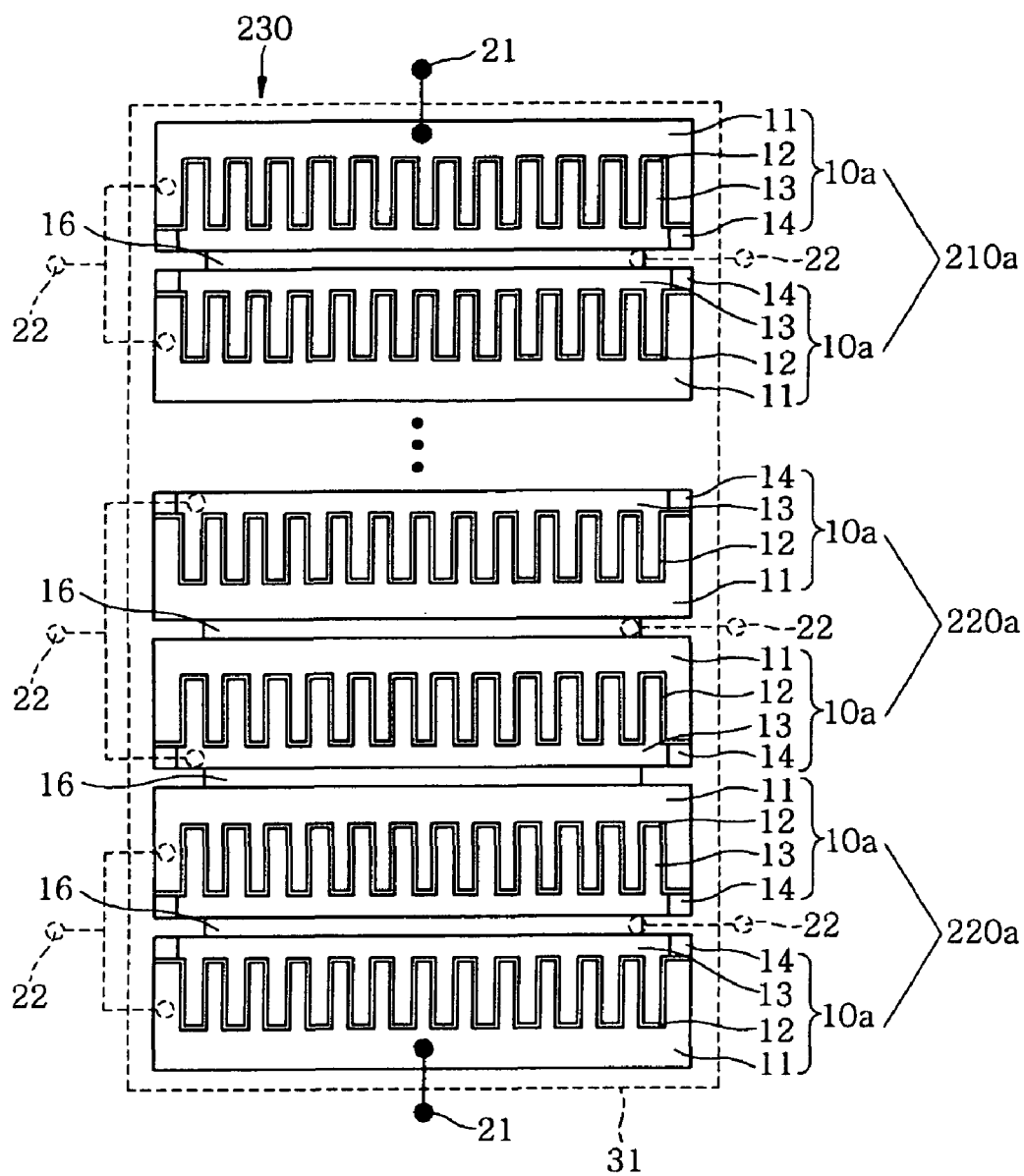
Figure 5D:
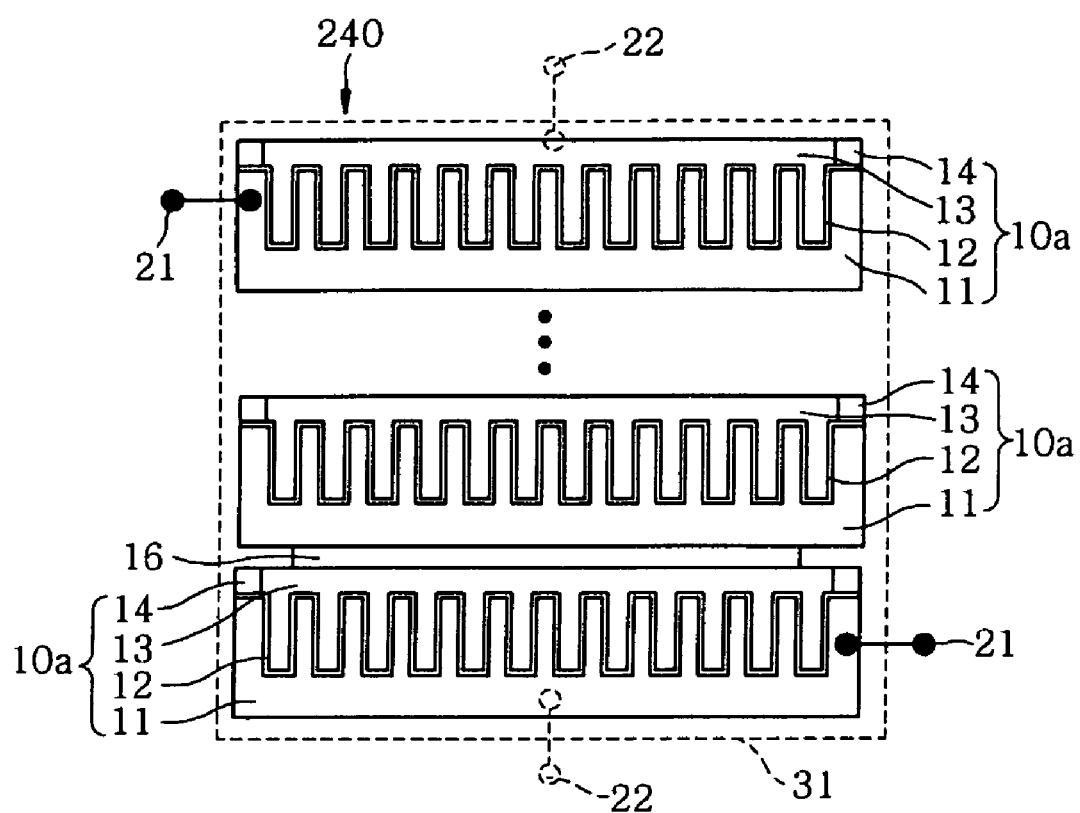

Metal capacitors 210, 220, 230, and 240 as shown in FIGS. 5A through 5D, have the same configuration as the metal capacitor 110, 120, 130, and 140 according to the second embodiment of the present invention as shown in FIGS. 4A through 4D. In particular, the metal capacitor 230 shown in FIG. 5C is constructed by providing a plurality of first parallel multi-layer bodes 210a and a plurality of second parallel multi-layer bodies 220a in series like the plurality of first parallel multi-layer bodies 110a and the plurality of second parallel multi-layer bodies shown in FIG. 4C.

The metal oxide film 12 of each single metal capacitance member 10 constituting the metal capacitors 210, 220, 230, and 240 according to the third embodiment of the present invention that have the same configuration as the metal capacitors 110, 120, 130, and 140 according to the second embodiment of the present invention is formed by a different way from the metal oxide film 12 of each single metal capacitance member 10a of the metal capacitors 110, 120, 130, and 140 according to the second embodiment shown in FIGS. 4A through 4D. Specifically, as shown in FIGS. 4A through 4D, the metal capacitors 110, 120, 130, and 140 form the meal oxide film 12 on the whole surface of the metal member. On the other hand, as shown in FIGS. 5A through 5D, the metal capacitors 210, 220, 230, and 240 form the metal oxide film 12 on one surface of the metal member 11 where the plurality of grooves 11a is formed.

Since the metal oxide film 12 is formed on one surface of the metal member 11 where the plurality of grooves 11a is formed, the metal capacitors 210, 220, 230, and 240 according to the third embodiment of the present invention may reduce noise components such as a parasitic capacitance and the like caused by the metal oxide film 12 when providing the plurality of single layer metal capacitance members 10a.

Hereinafter, a method of manufacturing a metal capacitor according to the present invention constructed as above will be described with reference to FIGS. 1A through 1E.

Another surface of the metal member 11 is masked using a resin film (not shown) to form a plurality of grooves 11a by etching only one surface of the metal member 11. In addition to a scheme of attaching a resin-based film onto the other surface of the metal member 11 and thereby masking, the masking process uses a scheme of applying photoresist and baking to mask the other surface of the metal member. When forming the electrode withdrawing portion m on the metal member 11 as shown in FIG. 2B or 3B during the process of masking the other surface of the metal member 11, only one surface of the metal member 11 corresponding to the electrode withdrawing portion m is masked.

Figure 1B:
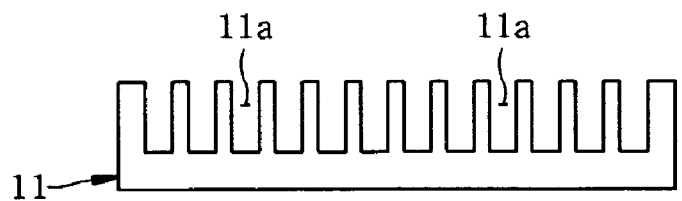
Figure 1C:
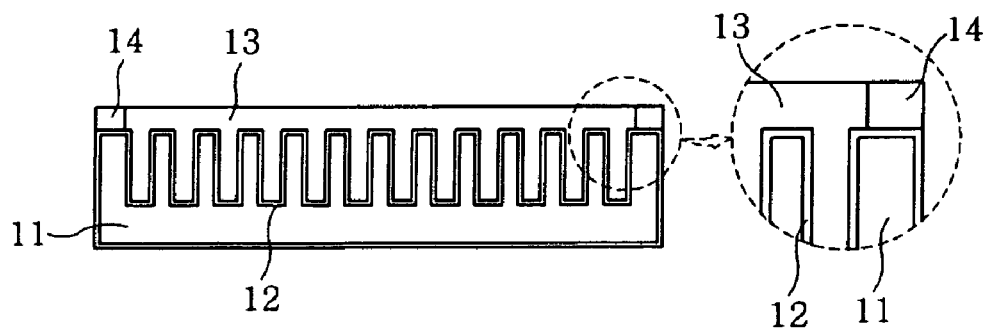
Figure 1D:
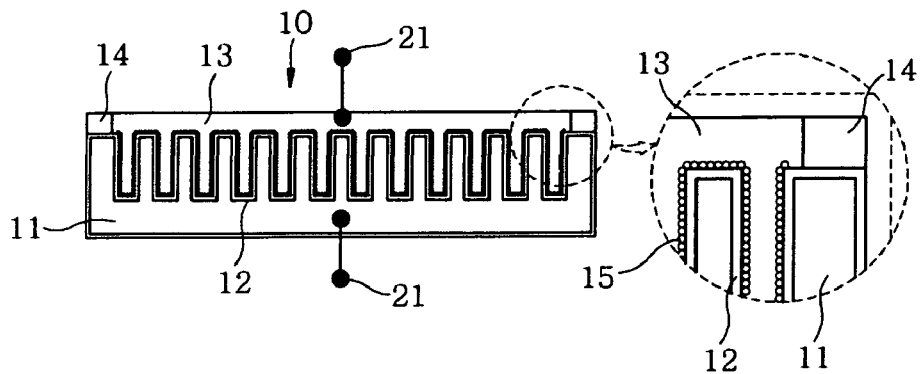
Figure 1E:
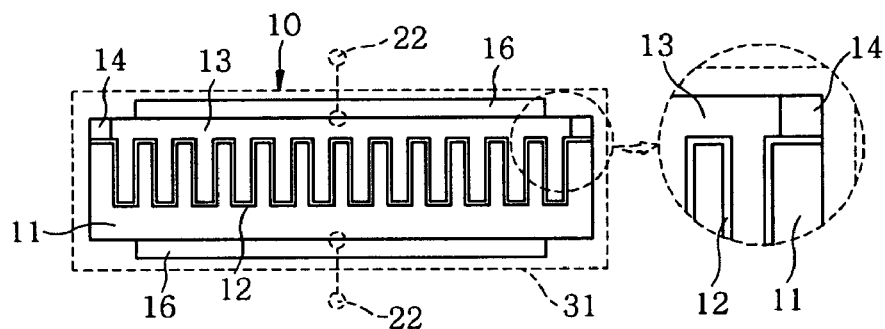

When the other surface of the metal member 11 is masked, the plurality of grooves 11a is formed to be arranged on one surface of the metal member 11 by using a direct current (DC) etching as shown in FIG. 1B. Here, the DC etching sprays insulating oil-based ink (not shown) on the surface of aluminum foil to be etched. In this instance, an ink spray region may be limited using screen printing to thereby secure an exposure portion. The DC etching dries the aluminum foil sprayed with the insulating oil-based ink in the temperature of about 50° C. through 200° C., generates an anodizing film in the aqueous solution of ammonium adipate 15% with 10 through 20V in the temperature of 70° C. through 90° C. The DC etching places the aluminum foil formed with the anodizing film in an organic solvent such as ethanol, acetone, benzene and the like to thereby remove the insulating oil-based ink and it again in an deionized water. Next the aluminum foil is etched.

During the etching process using the DC etching, the plurality of grooves 11a is formed in the shape of a circle as shown in FIG. 1a, or is formed in the shape of a polygon such as the square groove 11b or the hexagonal groove 11c as shown in FIG. 2a or FIG. 3a. When forming the plurality of grooves 11a in various shapes in cylindrical form, the diameter thereof is about 1 µm to about 100 µm. The etching scheme uses an alternate current (AC) etching or a wet etching in addition to the DC etching.

When the plurality of grooves 11a is formed on the metal member 11, the metal oxide film 12 is formed on the metal member 11 by using an anodizing method. The process of forming the metal oxide film 12 forms the metal oxide film 12 on the whole surface of the metal member 11 as shown in FIG. 1C, 2B, or 3B, or only one surface where the plurality of grooves is formed, as shown in FIG. 1E, FIG. 2C, or FIG. 3C.

The anodizing method removes a boiling process, proceeds first oxidation in an aqueous solution of boric and boric acid-ammonium with 150 voltages and proceeds a plurality of oxidations with changing the concentration and the voltage of the aqueous solution. The anodizing method performs a thermal treatment in the predetermined temperature to perform a reforming process. Also, the anodizing method forms a metal oxide film with restraining generation of a hydroxide film to the maximum by increasing the first and the second current density 1.5 through three times. The anodizing method may perform a by-product treatment in order to remove the by-product generated in the reforming process and further proceed the reforming process and the thermal treatment depending on the requirement of a user. Also, the anodizing method proceeds a predetermined cleaning process in order to clean boric acid or phosphoric acid.

As shown in FIG. 1C, the insulating layer 14 is formed on the metal oxide film 12 and/or a sealing electrode member 13 by using a Chemical Vapor Deposition (CVD) as shown in FIG. 1C. Although the CVD is used herein, it is possible to apply any one of a dipping process using an insulating resin or insulating ink, a spray process using ink-jet printing or screen printing, and a stamping process.

A sealing electrode member 13 is formed to fill in the plurality of grooves 11a formed on the metal member 11 via a plurality of seed electrode layers by using an electroplating, or an electroless plating as shown in FIG. 1D. In the seed electrode layer, a predetermined amount of sulfuric acid palladium applies as an activator. Also, it proceeds a cleaning process in order remove the activator after passing a predetermined time.

A process of forming the seed electrode layer 15 to more readily fill in the sealing electrode member 13 in the plurality of grooves 11a is further provided between a process of forming the sealing electrode member 13 and a process of forming the metal oxide film 12. Forming of the seed electrode layer 15 uses any one of CVD, metal organic CVD (MOCVD), and molecular beam epitaxy (MBE). However, the seed electrode layer 15 may be removed and not be applied depending on requirement of the user.

The plurality of first external electrodes 21 is connected to the metal member 11 or the sealing electrode member 13 as shown in FIG. 1D. In this process, the plurality of first external electrodes 21 is connected to the plurality of second external electrodes 22 as shown in FIG. 1E. The plurality of second external electrodes 22 is connected to the metal member 11 and the sealing electrode member 13 respectively. One of the plurality of second external electrodes 22 is an anode electrode and another there is a cathode electrode. As shown in FIG. 1E, a process of forming the conductive adhesive member 16 to more readily connect the plurality of first external electrodes 21 or the plurality of second external electrodes 22 to the metal member 11 or the sealing electrode member 13 is further provided between the process of forming such electrode and a process of forming the insulating layer 14. Forming of the conductive adhesive member 16 uses any one of metal adhesives, solder paste, electroless plating, and electrode plating.

As shown in FIG. 1E, when the plurality of first external electrodes 21 or the plurality of second external electrodes is connected, the metal member 11 is sealed using a sealing member to externally expose the plurality of first external electrodes 21 or the plurality of second external electrodes 22. The process of sealing the metal member 11 using the sealing member seals the metal member 11 using a molding material or a cover member with an empty inside. Through this, the metal capacitor 10 is manufactured.

According to the present invention, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, since the polarity has no directivity, a relatively higher safety is provided. Also, it is possible to improve a miniature, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
   a metal member including a plurality of grooves formed in a portion of one surface thereof;
   a metal oxide film formed on the metal member and the grooves therein;
   a metallic seed electrode layer formed directly on the metal oxide film on the portion of the one surface and in the grooves therein;
   a sealing electrode member formed directly on at least the metallic seed electrode layer to fill in the plurality of grooves;
   an insulating layer formed on the metal oxide film external to the portion of the one surface to insulate the metal member and the sealing electrode member; and
   a pair of external electrodes respectively connected to the metal member and the sealing electrode.

2. The metal capacitor of claim 1, wherein the metal member is formed 4 as a foil or in a planar shape and uses any formed of one of aluminum (Al), niobium (Nb), tantalum (Ta), zirconium (Zr), and titanium (Ti).

3. The metal capacitor of claim 1, wherein the plurality of grooves formed on the metal member is formed in the shape of a circle or a polygon and the diameter of groove is about 1 μm to about 100 μm.

4. The metal capacitor of claim 1, wherein the metal member further includes at least one electrode withdrawing portion.

5. The metal capacitor of claim 1, wherein the metal oxide film is formed of one of alumina ($Al_2O_3$), niobium pentoxide ($Nb_2O_5$), niobium monoxide (NbO), tantalum pentoxide ($Ta_2O_5$), zirconium dioxide ($ZrO_2$), and titanium dioxide ($TiO_2$).

6. The metal capacitor of claim 1, wherein the sealing electrode member is formed of one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

7. The metal capacitor of claim 1, wherein the metallic seed electrode layer is formed of one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

8. The metal capacitor of claim 1, wherein the metal member is sealed by a molding member and the molding member molds the metal member in any one of a planar shape and a cylindrical shape, and when molding the metal member in the cylindrical shape, the molding member winds and molds the metal member.

9. A metal capacitor comprising:
a plurality of single layer metal capacitance members, each comprising a metal member including a plurality of grooves formed in a portion of one surface thereof, a metal oxide film formed on at least the portion of the one surface having the grooves formed therein, a metallic seed electrode layer formed directly on the metal oxide film on the portion of the one surface and in the grooves therein, a sealing electrode member formed directly on at least the metallic seed electrode layer to fill in the plurality of grooves, and an insulating layer formed on the sealing electrode member and/or the metal oxide film to insulate the metal member and/or the sealing electrode member; and
a plurality of first external electrodes respectively connected to the metal member of each of the plurality of single layer metal capacitance members,
wherein the sealing electrode members of each of the plurality of single layer metal capacitance members are coupled together.

10. The metal capacitor of claim 9, wherein the metal oxide film of each of the plurality of single layer metal capacitance members is formed on the whole surface of the metal member.

11. The metal capacitor of claim 9, wherein the plurality of single layer metal capacitance members are respectively connected to a plurality of second external electrodes one of which is an anode electrode and another of which is a cathode electrode, and
one of the plurality of second external electrodes is connected to the metal member of each of the plurality of single layer metal capacitance members and another thereof is connected to the sealing electrode members.

12. The metal capacitor of claim 9, wherein a conductive adhesive member is further interposed between the plurality of single layer metal capacitance members to improve adhesiveness.

13. The metal capacitor of claim 9, wherein the plurality of single layer metal capacitance members further comprises a molding member, and
the molding member molds the plurality of single layer metal capacitance members in any one of a planar shape and a cylindrical shape, and when molding the metal member in the cylindrical shape, the molding member winds and molds the plurality of single layer metal capacitance members.

14. A metal capacitor comprising:
a plurality of single layer metal capacitance members, each comprising a metal member including a plurality of grooves formed in a portion of one surface thereof, a metal oxide film formed on the metal member and the grooves therein, a plurality of metallic seed electrode layers formed directly on the metal oxide film on the portion of the one surface to fill in the plurality of grooves and form a sealing electrode member, and an insulating layer formed on the sealing electrode member and/or the metal oxide film to insulate the metal member and the sealing electrode member; and
a plurality of first external electrodes respectively connected to the sealing electrode member of each of the plurality of single layer metal capacitance members,
wherein the metal member of each of the plurality of single layer metal capacitance members are coupled together.

15. The metal capacitor of claim 14, wherein the plurality of single layer metal capacitance members are respectively connected to a plurality of second external electrodes one of which is an anode electrode and another of which is a cathode electrode, and
one of the plurality of second external electrodes is connected to the sealing electrode member of each of the plurality of single layer metal capacitance members and another thereof is connected to the metal members.

16. A metal capacitor comprising:
a plurality of first multi-layer bodies formed by a plurality of first single layer metal capacitance members, each first single layer metal capacitance member comprising a first metal member including a plurality of first grooves formed in a portion of one surface thereof, a first metal oxide film formed on the first metal member and the first grooves therein, a first metallic seed electrode layer formed directly on the first metal oxide film on the portion of the one surface and in the first grooves therein, a first sealing electrode member formed directly on the first metallic seed electrode layer to fill in the plurality of first grooves, and a first insulating layer formed on the first sealing electrode member and/or the first metal oxide film to insulate the first metal member and the first sealing electrode member, a first sealing electrode member of an odd $number^{th}$ first single layer metal capacitance member connects with a first sealing electrode member of an even $number^{th}$ first single layer metal capacitance member;
a plurality of second multi-layer bodies formed by a plurality of second single layer metal capacitance members, each second single layer metal capacitance member comprising a second metal member including a plurality of second grooves formed in a portion of one surface thereof, a second metal oxide film formed on the second metal member, a second metallic seed electrode layer formed directly on the second metal oxide film on the portion of the one surface and in the second grooves therein, a second sealing electrode member formed directly on the second metallic seed electrode layer to fill in the plurality of second grooves, and a second insulating layer formed on the second sealing electrode member and the second metal oxide film to insulate the second metal member and the second sealing electrode member, a second metal member of the odd $number^{th}$ second single layer metal capacitance member connects with a second metal member of the even $number^{th}$ second single layer metal capacitance member; and
a plurality of first external electrodes being connected to the first metal member of the odd $number^{th}$ single layer metal capacitance member of a first of the plurality of first multi-layer bodies and the second metal member of the even $number^{th}$ second single layer metal capacitance member of a last of the plurality of second multi-layer bodies,
wherein the plurality of first multi-layer bodies and the plurality of second multi-layer bodies are connected in series with the first metal member of the even $number^{th}$ first single layer metal capacitance member of the first multi-layer connected with the second sealing electrode member of the odd $number^{th}$ second single layer metal capacitance member of the second multi-layer body.

17. The metal capacitor of claim 16, wherein the plurality of first multi-layer bodies are respectively connected to a plurality of second external electrodes one of which is an anode electrode and another of which is a cathode electrode, and one of the plurality of second external electrodes is connected to the first metal member of each of the plurality of first single metal capacitance members of the plurality of first parallel multi-layer bodies and the other is connected to the first sealing electrode member.

18. The metal capacitor of claim 16, wherein the plurality of second multi-layer bodies are respectively connected to the plurality of second external electrodes one of which is an anode electrode and another of which is a cathode electrode, and one of the plurality of second external electrodes is connected to the second sealing electrode member of each of the plurality of second single metal capacitance members of the plurality of second multi-layer bodies and the other is connected to the second metal member.

19. The metal capacitor of claim 16, wherein a conductive adhesive member is further interposed between each of the plurality of first multi-layer bodies and each of the plurality of second multi-layer bodies.

20. The metal capacitor of claim 16, wherein the first and second metal oxide films respectively of each of the plurality of first and second single layer metal capacitance members formed on the plurality of first parallel multi-layer bodies and the plurality of second parallel multi-layer bodies is formed on the whole surface of the respective first and second metal member.

21. A metal capacitor comprising;
a plurality of single layer metal capacitance members, each comprising a metal member including a plurality of grooves formed in a portion of one surface thereof, a metal oxide film formed on the metal member and in the plurality of grooves, a metallic seed electrode layer formed directly on the metal oxide film on the portion of the one surface and in the grooves therein, a sealing electrode member formed directly on at least the metallic seed electrode layer to fill in the plurality of grooves, and an insulating layer being formed on the sealing electrode member and an exposed portion of the metal oxide film to insulate the metal member and/or the sealing electrode member; and
a plurality of first external electrodes being connected to the metal member of a first and a last single layer metal capacitance members among the plurality of single layer metal capacitance members,
wherein the plurality of single layer metal capacitance members are connected in series with the metal members being respectively connected to a corresponding sealing electrode member of an adjacent single layer metal capacitance member.

22. The metal capacitor of claim 21, wherein the plurality of single layer metal capacitance members are respectively connected to a plurality of second external electrodes one of which is an anode electrode and another of which is a cathode electrode, and
one of the plurality of second external electrodes is connected to the metal member of a first single layer metal capacitance member among the plurality of single layer metal capacitance members and another thereof is connected to the sealing electrode member of the last single layer metal capacitance member.

23. The metal capacitor of claim 21, wherein the metal oxide film of each of the plurality of single layer metal capacitance members is formed on the whole surface of the metal member thereof.

24. The metal capacitor of claim 1, wherein the metal member is formed of one of niobium (Nb), tantalum (Ta), zirconium (Zr), and titanium (Ti).

25. The metal capacitor of claim 24, wherein the metal oxide film is formed of one of niobium pentoxide ($Nb_2O_5$), niobium monoxide (NbO), tantalum pentoxide ($Ta_2O_5$), zirconium dioxide ($ZrO_2$), and titanium dioxide ($TiO_2$).

26. The metal capacitor of claim 24, wherein the sealing electrode member and the metallic seed electrode layer are formed of one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

27. The metal capacitor of claim 1, wherein the sealing electrode member is formed by a plurality of further metallic seed electrode layers overlaying the metallic seed electrode layer that is formed directly on the metal oxide film.

28. The metal capacitor of claim 9, wherein the sealing electrode member is formed by a plurality of further metallic seed electrode layers overlaying the metallic seed electrode layer that is formed directly on the metal oxide film.

29. The metal capacitor of claim 21, wherein the sealing electrode member is formed by a plurality of further metallic seed electrode layers overlaying the metallic seed electrode layer that is formed directly on the metal oxide film.

30. A metal capacitor comprising:
a metal member including a plurality of grooves formed in a portion of one surface thereof, the metal member being formed of one of aluminum (Al), niobium (Nb), tantalum (Ta), zirconium (Zr), and titanium (Ti);
a metal oxide film formed on the metal member and the grooves therein, the metal oxide is formed of one of alumina ($Al_2O_3$), niobium pentoxide ($Nb_2O_5$), niobium monoxide (NbO), tantalum pentoxide ($Ta_2O_5$), zirconium dioxide ($ZrO_2$), and titanium dioxide ($TiO_2$);
a sealing electrode member overlaying the metal oxide film to fill in the plurality of grooves, the sealing electrode member being formed of one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au); and
an insulating layer formed on the metal oxide film external to the portion of the one surface to insulate the metal member and the sealing electrode member; and
a pair of external electrodes respectively connected to the metal member and the sealing electrode.

31. A metal capacitor comprising:
a plurality of single layer metal capacitance members, each comprising a metal member including a plurality of grooves formed in a portion of one surface thereof and formed of one of aluminum (Al), niobium (Nb), tantalum (Ta), zirconium (Zr), and titanium (Ti), a metal oxide film formed on at least the portion of the one surface having the grooves formed therein and formed of one of one of alumina ($Al_2O_3$), niobium pentoxide ($Nb_2O_5$), niobium monoxide (NbO), tantalum pentoxide ($Ta_2O_5$), zirconium dioxide ($ZrO_2$), and titanium dioxide ($TiO_2$), a sealing electrode member overlaying the metal oxide film to fill in the plurality of grooves and formed of one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au), and an insulating layer formed on the sealing electrode member and/or the metal oxide film to insulate the metal member and/or the sealing electrode member; and
a plurality of first external electrodes respectively connected to the metal member of each of the plurality of single layer metal capacitance members, wherein the sealing electrode members of each of the plurality of single layer metal capacitance members are coupled together.

* * * * *